SIGNAL PROCESSING CIRCUITS

Filed July 30, 1954 2 Sheets-Sheet 1

INVENTOR.
Gordon F. Rogers
BY
[signature]
ATTORNEY

March 3, 1959 G. F. ROGERS 2,876,349

SIGNAL PROCESSING CIRCUITS

Filed July 30, 1954 2 Sheets-Sheet 2

INVENTOR.
Gordon F. Rogers
BY
[signature]
ATTORNEY

United States Patent Office 2,876,349

Patented Mar. 3, 1959

2,876,349

SIGNAL PROCESSING CIRCUITS

Gordon F. Rogers, Chicago, Ill., assignor to Radio Corporation of America, a corporation of Delaware Application July 30, 1954, Serial No. 446,933

8 Claims. (Cl. 250—27)

Figure 1:
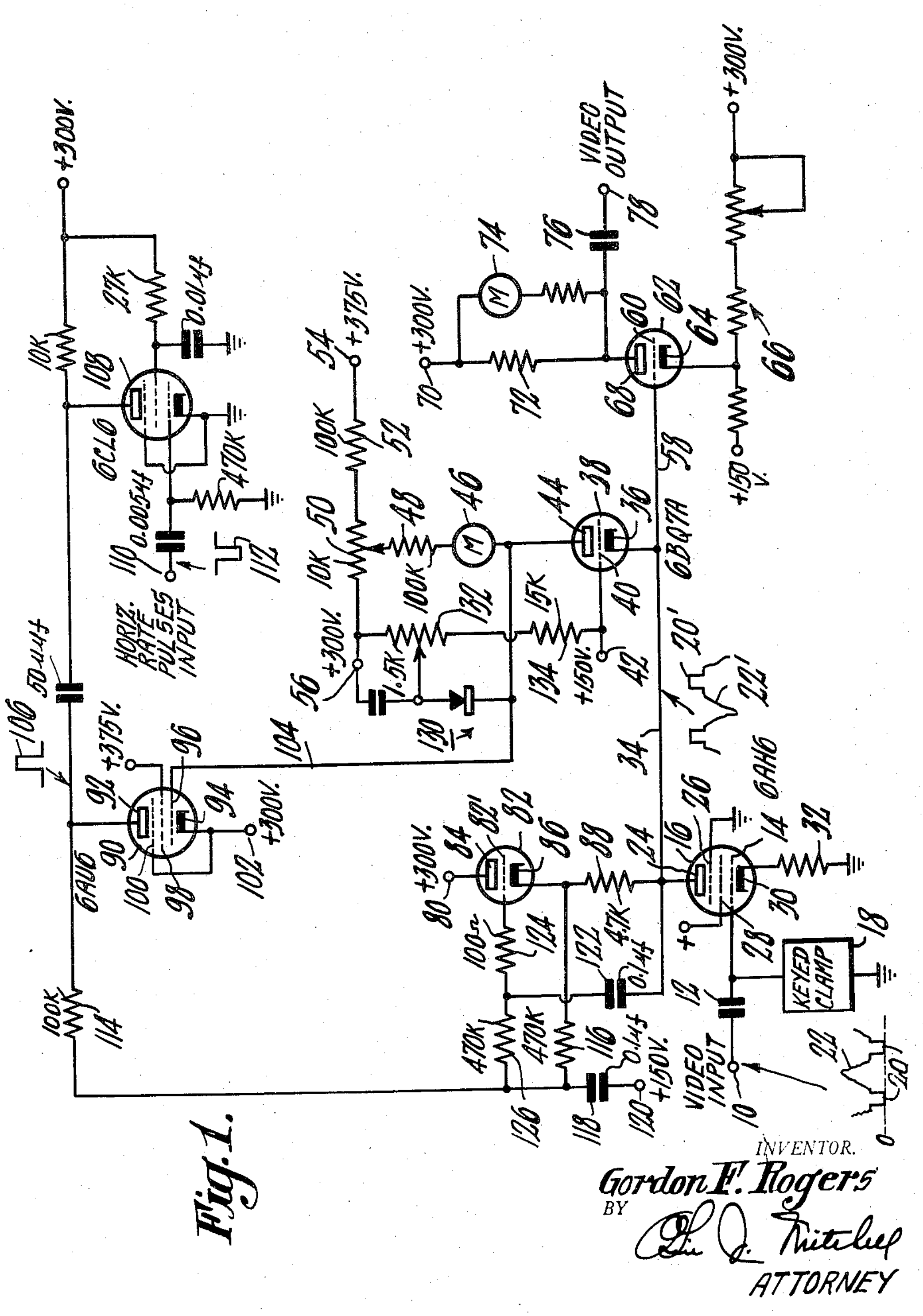

The present invention relates to novel signal processing circuits and, more particularly, to circuits having non-linear dynamic transfer characteristics of such nature as to alter the instantaneous amplitude values of a video signal in accordance with a predetermined curvature.

In the television art, the non-linearization of a signal, or "gamma correction" thereof, is necessary, for example, in compensating for the non-linearity of the usual image reproducing kinescope employed in television receivers. That is to say, conventional television camera pickup devices such as the well-known Orthicon and the like are generally linear in that their output signal voltage is at least approximately proportional to the light of the image being televised. As opposed thereto, however, image reproducing kinescopes of the usual type are quite non-linear devices, such that a plot of their light output versus signal input approximates a power law. By virtue of such disparity, a television system which makes no provision therefor cannot produce images having the proper brightness range and contrast.

In view of the need for compensating for the power law characteristics of television image reproducing tubes, there have been many proposals in the prior art for altering the characteristics of the system in a compensatory manner. One such arrangement is that described in an article entitled "A Rooter for Video Signals" by B. M. Oliver, Proceedings of the IRE, November 1950. As explained in the cited article, the "rooter" comprises a non-linear impedance driven by a linear current generator which furnishes a current which is directly proportional to the brightness of the subject being televised. Specifically, the rooter according to the article constitutes a triode which is cathode-driven from a high impedance source (viz. a pentode) whereby the potential of the cathode assumes a value proportional to a specific root of the applied current.

It is a primary object of the present invention to provide new and improved "gamma correction" circuits of the "rooter" type, that is, circuits in which a linear video signal is altered to conform to a predetermined mathematical root.

As pointed out in the above-cited article, and as is well-known to those in the art, any alteration of a video signal which is of a non-linear nature requires that the signal be referenced to a predetermined level, in order that the non-linear action on the signal may be uniform for different amplitude values thereof.

Hence it is another object of the present invention to provide novel gamma correction circuits in which means are provided for insuring that the signal under treatment will be referenced to a fixed level during the gamma correction process.

Another and more specific object herein is the provision of video signal rooter circuits having improved stability over that heretofore obtainable.

In general, the present invention contemplates the provision of means for maintaining constant the "black level current" which flows through the rooter tube of a rooter type gamma circuit. That is, means are provided in accordance with the invention for insuring that the current through the rooter tube during the horizontal blanking intervals is of a fixed value. According to certain specific forms of the invention as described herein, the black level current through the rooter tube is caused to be constant by the action of a direct current feedback loop including a variable direct current anode load impedance for the driver tube which applies the video signals to the rooter. As will be appreciated, the variable load tube of the present invention conducts all of the anode current of the driver tube except that small amount which flows through the rooter tube. The present system, as will appear, provides for stability of current through the rooter tube during the warm-up period, thereby precluding random brightness and contrast variations in the reproduced image during that period. Additionally, the gamma correction curve obtained through the use of the invention more nearly approximates the desired root characteristic than has been the case with prior art arrangements.

Figure 2:
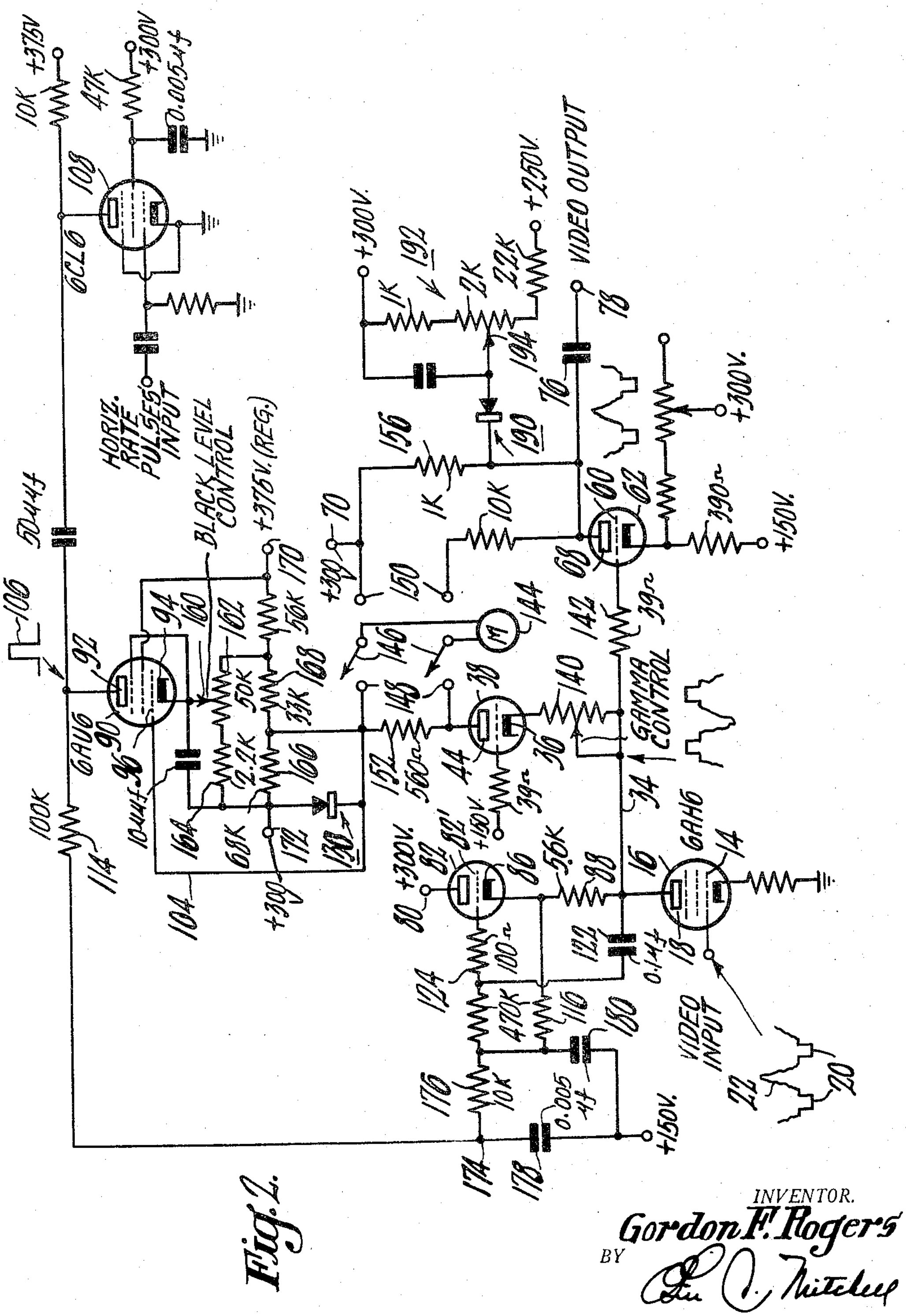

Additional objects and advantages of the present invention will become apparent to persons skilled in the art from a study of the following detailed description of the accompanying drawing, in which:

Fig. 1 illustrates, by way of schematic diagram, a circuit embodying the principles of the invention; and Fig. 2 is a schematic showing of another embodiment.

Referring to the drawing, particularly to Fig. 1, thereof, it will be seen that certain portions of the circuit illustrated are in essence the same as certain portions of the circuit shown in the Oliver article. In the interest of simplicity, therefore, those parts of the present circuitry which are substantially the same as those in the prior art disclosure will not be described in detail. A train of television signals derived in any suitable manner as, for example, through the agency of a conventional television camera tube or flying spot scanner is applied to the input terminal 10 of the apparatus and is coupled via a capacitor 12 to the control electrode 14 of a pentode driver tube 16. In order to restore the low frequency components to and to remove hum from the television signals, a keyed clamp circuit 18 is connected between a point of fixed potential (e. g. ground) and the junction of the capacitor 12 and control electrode 14. This clamp circuit also restores the D. C. components. The keyed clamp circuit 18 may be substantially the same as that shown in the Oliver article and it will be understood that its function is that of altering the charge on the capacitor 12 during horizontal blanking intervals of the television signal as necessary to clamp the recurrent blanking pedestals 20 to the reference potential. Hence, as illustrated, the television signal 22 at the control electrode 14 will have its blanking pedestal 20 aligned along the zero reference line.

The driver tube 16 further includes an anode 24, a suppressor electrode 26, a screen electrode 28 and a cathode 30, the last-named element being connected to ground through an unbypassed resistor 32, thereby affording a certain degree of increased linearity of operation by virtue of the negative feedback which it produces. The anode 24 of the driver tube 16 is connected directly via a lead 34 to the cathode 36 of a triode 38 which comprises the rooter tube as described by Oliver. The rooter 38 further includes a control electrode 40 which is connected to a source of positive operating potential at the terminal 42 and an anode 44 which is connected through a suitable current measuring device 46 and a resistor 48 to a point on the voltage divider comprising the resistors 50 and 52 which are connected serially between the sources of different positive potential at the terminals 54 and 56. The cathode 36 of the rooter tube is directly connected via a lead 58 to the control electrode 60 of an output amplifier 62 which is of generally conventional form and substantially as described in the cited article. The cathode 64 of the amplifier tube 62 is connected to a suitable point on a voltage dividing network 66 for supplying a fixed bias for the tube, while its anode 68 is connected to a source of positive operating potential at terminal 70 through a load resistor 72. The current through the amplifier 62 is measured by a meter 74 and the output signal of the circuit is applied via a capacitor 76 to the terminal 78, which terminal may be connected to any suitable utilization means.

As thus far described, the circuit of Fig. 1 is substantially in keeping with the arrangement proposed in the Oliver article and need not be described in detail. It should, however, be noted that in the article in question the anode of the pentode driver tube (i. e. that tube corresponding to the element 16 herein) is connected to a source of positive operating potential through a linear resistance and, specifically, a pair of resistors one of which is variable in value, the variable resistor being used to adjust the no-signal current through the rooter tube to a small fixed value. Assuming that the anode 24 of the tube 16 were connected to the terminal 80 through a resistance, the operation of the circuit would be as described by Oliver. That is to say, with incoming television signals 22 clamped by means of the circuit 18 at the control electrode 14 and of such polarity that black is in the negative direction, the signal 20′ at the lead 34 would drive the cathode 36 of the rooter tube 38. Since the pentode 16 is a linear current generator, the current through the rooter tube 38 is specified by the current supplied by the driver tube 16, so that the cathode 36 of the rooter tube will assume a potential proportional to the *n*th root of the applied current in accordance with the following relationship: $I_p=KE_c^n$, where $I_p$ is the current through the rooter tube, K is a constant, $E_c$ is the cathode potential and $n$ is the power law exponent approximated by the anode current versus grid voltage characteristic curve of the particular triode 38. Thus the current supplied by the driver tube 16 through the rooter tube 38 will cause its cathode 36 to experience voltage variations resembling the current wave form from the driver tube but differing therefrom in instantaneous amplitude values in accordance with the specific root characteristic of the tube 38.

With a linear resistance serving as the anode impedance of the driver tube 16 as in the prior art, the rooting action of the tube 38 is somewhat diluted at the high end of the impedance range, depending upon the value of the anode resistor. Additionally, however, no automatic control is available with such a prior art arrangement over the black level current through the rooter tube 38, a fact which renders the action of that tube less stable than is desirable.

An automatic control is desirable since the total current through the driver tube anode circuit may be as much as 40 times that through the rooter tube. Thus the prior art circuit tends to be less stable than the circuit arrangement of the present invention since small variations in the driver tube anode current can cause large variations in "black level" current through the rooter tube, particularly since the rooter tube presents a much lower effective resistance than the anode resistors. Hence, in accordance with the present invention, the additional circuitry of Fig. 1 is provided for maintaining substantially constant the current flowing through the rooter tube 38 during the recurrent horizontal blanking periods. As has been stated generally supra, this function is accomplished by the interposition of a variable direct current anode load for the pentode driver tube 16, which load is controlled by a direct current feedback loop.

The variable direct current load for the driver tube 16 comprises the tube 82 whose anode 84 is connected to the positive terminal 80 and whose cathode 86 is connected through an unbypassed resistor 88 to the anode 24 of the driver tube. Control of the D. C. resistance presented by the tube 82 is afforded in the following manner: a control tube 90 which may be a pentode, as shown, and having an anode 92, cathode 94, control electrode 96 and screen and suppressor electrodes 98 and 100, respectively, is biased by the potential at the terminal 102. Its control electrode 96 is connected via a lead 104 to the anode 44 of the rooter tube 38 so that the control electrode 96 of the control tube 90 receives a potential determined by the anode current of the rooter tube. The anode 92 of the control tube 90 is supplied with positive pulses 106 which occur coincidentally with the blanking intervals 20 of the television signal. The pulses 106 are supplied by a pulse amplifier 108 which receives at its input terminal 110 pulses 112 of the television horizontal or line rate. The pulses 106 will be understood, therefore, as being of sufficient amplitude to cause the anode of the control tube 90 to exceed the knee of the plate voltage-plate current characteristic of tube 90. Thus the anode current of rooter tube 38 during the time that the positive portion of pulses 106 is present determines the anode current of control tube 90. During the absence of pulses 106 there can be no anode current through control tube 90 since the anode 92 is negative with respect to the cathode 94.

The anode 92 of the control tube is further connected through an isolating resistor 114 to one end of a load resistor 116, the other end of which is connected to the cathode 86 of the variable load tube. A capacitor 118 connected between the junction of the resistors 114 and 116 and a point of fixed potential at the terminal 120 serves to bypass the horizontal rate pulses to A. C. ground, thereby preventing their appearance across the resistor 116. In addition capacitor 118 holds the junction of resistors 114 and 116 at essentially constant potential during the time of at least one line. As will be appreciated, it is the function of the variable load tube 82 to vary the average direct current through the rooter tube 38 to such a value that the current during horizontal blanking intervals is a predetermined value.

The anode 24 of the driver tube 16 is coupled via a capacitor 122 and anti-parasite resistor 124 to the control electrode 82′ of the load tube 82. Thus, any A. C. voltage variations appearing at the driver tube anode and applied to the cathode 86 of the load tube 82 through the resistor 88 will also be applied to the control electrode 82′ thereof. The variable load tube 82 presents a high impedance to the driver tube 16 since its effective impedance, as "seen" by the latter, is equal to its internal plate resistance ($r_p$) plus the cathode resistance (88) times the amplification factor of the tube. For alternating current, its control electrode 82′ is connected to the lower end of the resistor 88, thus permitting negative feedback by that resistor and also causing the driver tube 16 to be effectively connected to the plate impedance of the tube 82. An isolating resistor 126 prevents short circuiting the video signals by the capacitor 118 while providing a path for the D. C. control signal from control tube 90. It is to be noted that resistor 116 is returned to the cathode 86 so that there is no degeneration of the D. C. control signal in the tube 82. The D. C. change of potential of the cathode of tube 82 has very little effect on the D. C. voltage developed across resistor 116 since the source of this voltage is the pentode tube 90 and since the tube 90 is operated in the region where it is a constant current generator (i. e. the plate current is independent of the plate voltage).

As thus far described, the operation of the circuit of

Fig. 1, insofar as its control of the black level current through the rooter tube 38 is concerned, is as follows: assuming that the (black level) current through the rooter tube 38 during the horizontal blanking interval is greater than a predetermined value, the potential of the anode 44 will decrease, thereby (through the lead 104) lowering the potential on the electrode 96 of the control tube 90 so that when the tube 90 is pulsed by the pulse 106 occurring during horizontal blanking, its anode conduction will be lowered, thereby producing more current through resistor 114 to charge the condenser 118. Therefore the junction of resistors 114 and 116 assumes a more positive potential with respect to ground. The resultant direct current voltage developed across the resistor 116 is therefore proportional to the current through the rooter tube 38 during horizontal blanking and, since that direct current voltage is, in turn, applied to the control electrode 82′ of the variable load tube 82, conduction of the variable load tube will be increased. Such increased conduction of the variable load tube 82 causes a greater amount of the driver tube current to flow through the tube 82 and a smaller amount of the driver tube current to flow through the rooter tube 38. Hence the rooter tube black level current is brought back to its proper value. Conversely, a decrease in rooter tube current from its desired value produces the same series of events as described above but with the reverse sense, so that the resistance of the load tube 82 is increased in order to increase the rooter tube current as required.

In order to prevent too great a voltage drop at the anode 44 of the rooter tube during the video portions of the composite signal 20′, which, if permitted to occur, would produce an undesirable variation in the root characteristic of that tube, a crystal diode 130 is connected between the anode 44 of the rooter and the resistor 132 of the voltage dividing network which also includes a resistor 134. Thus, anode currents of the rooter tube above a predetermined value (e. g. black level current) flow through the crystal diode 130, thereby effectively shunting the resistors 48, 50 and 52. At low rooter tube current levels (i. e. below that required to render the diode 130 conductive), the effective resistance of the resistors in series with the rooter tube anode 44 has a small effect by reason of the fact that it is less than the internal plate resistance of that tube with such low currents.

From the foregoing, it should be understood that the circuit of Fig. 1 provides a rooter type gamma correction apparatus having high stability, even during warm-up periods, and in which the gamma correction curve is substantially closer to its required characteristic than is the case with a simple linear resistance connected to the anode of the driver tube 16, as in prior art arrangements.

Fig. 2 illustrates another embodiment of the invention in which those parts corresponding to the circuitry of Fig. 1 are indicated by the same reference numerals. As in the apparatus of Fig. 1, the composite television signal 22 of such polarity that black is in the negative direction is applied to the control electrode 14 of a pentode driver tube 16 whose anode 18 is connected to a source of positive potential at the terminal 80 through a variable load tube 82 having an unbypassed cathode resistor 88. The cathode 36 of the rooter tube 38 is connected through a variable resistor 140 and the lead 34 to the anode of the driver tube. The resistor 140 serves, therefore, as a "gamma control," in that variations of the resistor will produce corresponding variations in the root characteristic presented by the tube 38. The lower end of the gamma control resistor 140 is connected through a small resistor 142 (for parasitic suppression) to the control electrode 60 of an output amplifier 62. As opposed to the separate current measuring meters employed in the circuit of Fig. 1, a single meter 144 is provided in Fig. 2 for connection via switch members 146 to either of the sets of terminals 148 and 150. That is to say, when the switch members 146 are in contact with the terminals 148 the meter indicates the current through the rooter tube 38 as sampled by the resistor 152. With the switch members 146 in contact with the terminals 150, the meter 144 will measure the current through the output amplifier 62 whose anode 68 is connected to the positive potential terminal 70 through a load resistor 156 and to the signal output terminal 78 through the capacitor 76.

The end of resistor 152 remote from the rooter tube anode 44 is connected via the lead 104 to the control electrode 96 of the control tube 90 whose anode 92 is adapted to receive pulses 106 from a pulse amplifier 108 as in the circuit of Fig. 1. The cathode 94 of the control tube 90 in Fig. 2 is connected via an adjustable slider tap 160 to a suitable position on a resistor 162 which, together with the resistor 164, is in parallel with the load resistors 166 and 168 of the rooter tube 38. Thus, the potential applied to the anode 94 of the control tube 90 in Fig. 2 may be varied by movement of the "black level control" slider 160, whereby to vary the potential available at the slider as determined by the voltage division between the terminals 170 and 172. The adjustable slider tap 160 is termed a "black level control" since its positioning varies the cathode potential of the control tube 90, thereby, in turn, setting the black level current through the rooter tube 38, as will be understood more fully hereinafter.

The anode 92 of the control tube 90 is connected through an isolating resistor 114 to the input terminal 174 of the variable load circuit. A resistor 176 and a pair of shunt capacitors 178 and 180 form a filter circuit to prevent the application of horizontal rate pulses to the tube 82. The resistor 116 connected between the load tube cathode 86 and the righthand end of the resistor 176 acts as a resistive anode load for tube 90. The direct current signal from the control tube developed across resistor 116 is applied to the control electrode 82′ of the variable load tube, as described in connection with Fig. 1. The capacitor 122 connected between the driver tube anode 18 and the resistor 124 provides the alternating current signal path to the grid 82′ so that the resistor 88 is effective in causing cathode degeneration of tube 82, causing the variable load tube to appear as a high impedance A. C. load for the driver tube 16.

The operation of the apparatus of Fig. 2 as described thus far is substantially identical to that of Fig. 1, with the exception of the added gamma control 140 and black level control 160 whose purposes are, as set forth, those of varying the root characteristic of the tube 38 and setting the desired black current through the rooter tube, respectively. That is to say, movement of the slider tap 160 of the black level control in such direction as to increase the potential of the control tube cathode 94 causes an increase in the black current level as fixed by the operation of the control tube 90 and variable load tube 82. Conversely, movement of the slider tap 160 in the opposite direction results in a decrease in the fixed amount of black level current through the rooter tube.

The crystal diode 130 connected between the load 104 and the terminal 172 serves to prevent too great a voltage drop at the anode of the rooter tube as explained in connection with Fig. 1. In Fig. 2 the difference in potential for diode 130 is obtained by effectively returning the rooter tube load to a potential source more positive than the 300 volt bus rather than connecting the anode of the diode 130 to a source less positive than the 300 volt bus as in Fig. 1. The circuit in Fig. 2 has the advantage of providing a zero D. C. resistance source of potential for the diode with respect to anode current of tube 38 through the diode. Thus video signal content does not affect the effective bias voltage of the diode and therefore it starts to conduct at the same anode current in tube 38 regardless of the average anode current. Finally, and in the interest of completeness of description, a clipper diode 190 is connected between the anode 68 of the output tube 62 and a suitable point on a voltage dividing network 192 as determined by the positioning of a slider tap 194. The diode 190 is so polarized that it will be rendered conductive by those portions of the output signal more negative than a predetermined value, thereby clipping such negative portions and presenting a signal at the output terminal 78 which is free of noise during the blanking interval.

While the invention has been described herein as including a clamp circuit such as that indicated by the block 18 in Fig. 1, it should be borne in mind that the clamp circuit may be dispensed with where the input television signal 22 has sufficiently good low frequency characteristics and where the signal is free of "hum" components.

From the foregoing, those skilled in the art will recognize that the present invention affords circuits of the rooter type for providing improved and stabilized gamma correction and, though specific values for the various circuit components have been included in the drawing by way of illustration, it should be apparent that various changes in the specific components may be made without departing from the principles of the invention.

Having thus described my invention, what I claim as new and desire to secure by Letters Patent is:

1. A signal processing circuit comprising a source of signals having recurrent reference portions of fixed amplitude, said source having an output terminal; a rooter tube for imparting a predetermined non-linear amplitude characteristic to such signals, said tube having an anode and a cathode; means connecting said cathode to said output terminal of said source of signals; means connecting said anode to a source of operating potential such that said rooter tube comprises a current load for said signal source; a variable load impedance for said signal source having an input terminal connected to said output terminal and a conduction controlling electrode, said variable load impedance being in parallel with said rooter tube; and means operatively coupled between said rooter tube and said conduction controlling electrode for impressing a signal upon said electrode having a predetermined relation to the current in said rooter tube during such recurrent reference portions of such signals so as to vary the conduction of said variable load impedance in proportion to the current through said rooter tube during such reference signal portions.

2. A signal processing circuit comprising a source of signals having recurrent reference portions of fixed amplitude, said source having an output terminal; a rooter tube for imparting a predetermined non-linear amplitude characteristic to such signals, said tube having an anode and a cathode; means connecting said cathode to said output terminal of said source of signals; means connecting said anode to a source of operating potential such that said rooter tube comprises a current load for said signal source; a variable load impedance for said signal source having an input terminal connected to said output terminal and a conduction controlling electrode; and means operatively coupled between said rooter tube and said conduction controlling electrode for impressing a signal upon said electrode having a predetermined relation to the current in said rooter tube during such recurrent reference portions of such signals so as to vary the conduction of said variable load impedance in proportion to the current through said rooter tube during such reference signal portions, said signal source comprising a constant current source and said rooter tube and said variable load impedance being in parallel with each other for direct current.

3. A signal processing circuit comprising a source of signals having recurrent reference portions of fixed amplitude, said source having an output terminal; a rooter tube for imparting a predetermined non-linear amplitude characteristic to such signals, said tube having an anode and a cathode; means connecting said cathode to said output terminal of said source of signals; means connecting said anode to a source of operating potential such that said rooter tube comprises a current load for said signal source; a variable load impedance for said signal source having an input terminal connected to said output terminal and a conduction controlling electrode; and means operatively coupled between said rooter tube and said conduction controlling electrode for impressing a signal upon said electrode having a predetermined relation to the current in said rooter tube during such recurrent reference portions of such signals so as to vary the conduction of said variable load impedance in proportion to the current through said rooter tube during such reference signal portions, said last-named means comprising a control tube having a cathode, an anode, and a control electrode, a direct current path between the anode of said rooter tube and said control tube control electrode, a direct current path between said control tube anode and said conduction controlling electrode of said variable load impedance and means for applying keying signals to said control tube anode during said recurrent reference portions of such signals.

4. The invention as defined by claim 3 including a capacitor connected between and defining an alternating current path from said signal source output terminal and said variable load impedance conduction controlling electrode.

5. The invention as defined by claim 3 including a unilaterally conductive device having a cathode and an anode; a direct current connection between said cathode of said unilaterally conductive device and said rooter tube anode; and means for biasing said anode of said unilaterally conductive device.

6. The invention as defined by claim 3 including a unilaterally conductive device having a cathode and an anode; a direct current connection between said cathode of said unilaterally conductive device and said rooter tube anode; and means for biasing said anode of said unilaterally conductive device to cause said unilaterally conductive device to be rendered conductive at a predetermined current level through said rooter tube.

7. A signal processing circuit which comprises a source of signals having recurrent reference portions of fixed amplitude; an amplifier having an input terminal coupled to said source in signal receiving relation therewith and an output terminal; a load impedance connected to said amplifier output terminal; a rooter circuit comprising an electronic conduction device having first and second electrodes defining a current path; means connecting said first electrode to said amplifier output terminal; means connecting said second electrode to a source of operating potential such that said electron conduction device comprises a current load for said amplifier stage in parallel with said load impedance, said electronic conduction device having a non-linear transfer characteristic so as to impart a non-linear amplitude characteristic to signals appearing at said amplifier output terminal; a source of keying pulses occurring in synchronism with said recurrent signal portions; circuit means operated by said keying pulses for effectively sampling the current following through said rooter circuit device during the occurrence of said recurrent signal portions; and means responsive to said last-named means for controlling the division of current between said load impedance and said electronic conduction device in such manner as to maintain substantially constant the current through said electronic conduction device during such recurrent signal portions.

8. A signal processing circuit which comprises a source of signals having recurrent reference portions of fixed amplitude; an amplifier tube having an input terminal and an output terminal; a load impedance connected to said amplifier output terminal; means for applying signals from said source to said amplifier input terminal; a rooter circuit comprising an electron tube having a cathode, anode and control electrode; means connecting said anode to a source of operating potential and means connecting said cathode to said amplifier tube output terminal such that said electron tube comprises a current load for said amplifier in parallel with said load impedance, said electron tube having a non-linear anode current versus cathode potential characteristic so as to impart a corresponding non-linear amplitude characteristic to signals appearing at said amplifier tube output terminal; and means operative during the intervals of said recurrent reference signal portions for controlling the division of current through said electron tube and said amplifier load impedance in such manner as to maintain substantially constant the current through said electron tube during said intervals.

References Cited in the file of this patent

UNITED STATES PATENTS

| | | |
|---|---|---|
| 2,269,001 | Blumlein | Jan. 6, 1942 |
| 2,517,863 | Froman | Aug. 8, 1950 |
| 2,597,630 | French | May 20, 1952 |
| 2,658,117 | Sunstein et al. | Nov. 3, 1953 |
| 2,670,409 | Cooper | Feb. 23, 1954 |
| 2,679,029 | Jose | May 18, 1954 |
| 2,737,547 | Deming | Mar. 6, 1956 |